Patented Oct. 6, 1953

2,654,751

UNITED STATES PATENT OFFICE 2,654,751

SUBSTITUTED 2-METHYLPIPERIDINOPROPYL BENZOATE SALTS OF PENICILLIN

Harley W. Rhodehamel, Jr., Indianapolis, Ind., assignor to Eli Lilly and Company, Indianapolis, Ind., a corporation of Indiana No Drawing. Application February 13, 1952,
Serial No. 271,446

3 Claims. (Cl. 260—239.1)

This invention relates to novel penicillin salts and the preparation thereof.

I have discovered that compounds of the group consisting of 2-methylpiperidinopropyl-3,5-dimethoxybenzoate and 2-methylpiperidinopropyl-3,4-dichlorobenzoate or their salts can be combined with penicillin or its salts by neutralization or metathetical reactions to form sparingly soluble penicillin salts, thereby affording a means of precipitating penicillin from solution, and of purifying penicillin. Moreover, the novel penicillin salts can be utilized therapeutically. A prolonged penicillin blood level can be secured upon administering the salts parenterally by methods known to the medical art.

The following examples illustrate the preparation of the novel salts of this invention:

Example 1

To a solution of 2 g. of penicillin (e. g. a commercial mixture of the several penicillins) dissolved in 30 ml. of amyl acetate are added 2 g. of 2 - methylpiperidinopropyl - 3,5 - dimethoxybenzoate dissolved in 40 ml. of amyl acetate. The mixture is cooled and stirred occasionally whereupon the 2-methylpiperidinopropyl-3,5-dimethoxybenzoate salt of penicillin precipitates. The salt is isolated as by decantation or filtration, and dried in vacuo.

The salt is represented by the following formula in which P represents penicillin:

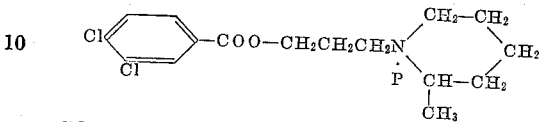

Example 2

To an aqueous solution of 0.3 g. of the potassium salt of penicillin G in 1.8 ml. of water is added a solution of 0.3 g. of 2-methylpiperidinopropyl-3,5-dimethoxybenzoate hydrochloride in 5 ml. of water. The mixture is cooled and stirred occasionally whereupon the slightly soluble 2-methylpiperidinopropyl - 3,5 - dimethoxybenzoate salt of penicillin G precipitates. The salt is separated, and dried in vacuo.

Example 3

To an aqueous solution of about 0.3 g. of 2-methylpiperidinopropyl - 3,4 - dichlorobenzoate hydrochloride and 25 ml. of water is added a solution of 0.3 g. of the potassium salt of penicillin G in 1.8 ml. of water. The mixture is cooled and stirred occasionally whereupon the slightly soluble 2-methylpiperidinopropyl-3,4-dichlorobenzoate salt of penicillin G precipitates. The salt is separated and dried in vacuo.

The salt is represented by the following formula in which P represents penicillin:

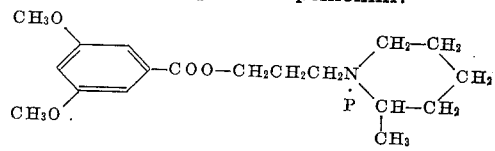

The salt-forming compounds are prepared by esterification procedures known to the art. Thus 2 - methylpiperidinopropyl - 3,4 - dichlorobenzoate is obtained by the esterification of 3,4-dichlorobenzoic acid with 2-methylpiperidinopropanol, and 2-methylpiperidinopropyl-3,5-dimethoxybenzoate is prepared by esterification of 3,5-dimethoxybenzoic acid with 2-methylpiperidinopropanol. The acid addition salts of 2-methylpiperidinopropyl-3,4-dichlorobenzoate and 2-methylpiperidinopropyl - 3,5 - dimethoxybenzoate are prepared by the usual methods, as for example the interreaction of equivalent amounts of the base and a selected acid in inert solvent solution, followed by removal of the solvent.

I claim:

1. A salt of penicillin with a compound of the group consisting of 2-methylpiperidinopropyl-3,4-dichlorobenzoate and 2-methylpiperidinopropyl-3,5-dimethoxybenzoate.

2. The 2-methylpiperidinopropyl-3,4-dichlorobenzoate salt of penicillin.

3. The 2-methylpiperidinopropyl-3,5-dimethoxybenzoate salt of penicillin.

HARLEY W. RHODEHAMEL, JR.

References Cited in the file of this patent

UNITED STATES PATENTS

| Number | Name | Date |
|---|---|---|
| 2,515,898 | Rhodehamel | July 18, 1950 |

FOREIGN PATENTS

| Number | Country | Date |
|---|---|---|
| 659,775 | Great Britain | Oct. 24, 1951 |

OTHER REFERENCES

Ballaro; "Ciencia e Investigacion," vol. 4 Nov. 1948, pp. 481, 482.

Rhodehamel: "J. Am. Chem. Soc.," vol. 73, Dec. 1951, p. 5902.